(12) United States Patent
Cheshire

(10) Patent No.: US 6,857,393 B2
(45) Date of Patent: Feb. 22, 2005

(54) CHESHIRE CAT HOUSE

(75) Inventor: Jill Cheshire, Hong Kong (HK)

(73) Assignee: Jill Cheshire Design, North Point (HK)

( * ) Notice: Subject to any disclaimer, the term of this patent is extended or adjusted under 35 U.S.C. 154(b) by 0 days.

(21) Appl. No.: 10/610,194

(22) Filed: Jun. 30, 2003

(65) Prior Publication Data

US 2004/0025801 A1 Feb. 12, 2004

Related U.S. Application Data

(63) Continuation-in-part of application No. 29/156,032, filed on Feb. 25, 2002, now Pat. No. Des. 476,780.
(60) Provisional application No. 60/459,799, filed on Apr. 2, 2003.

(30) Foreign Application Priority Data

Dec. 7, 2001 (GB) .............................. 2106757

(51) Int. Cl.[7] ................................. A01K 1/03
(52) U.S. Cl. .................. 119/455; 119/452; 119/706
(58) Field of Search ............................ 52/106; 119/452, 119/453, 455, 472, 480, 481, 706; D30/108

(56) References Cited

U.S. PATENT DOCUMENTS

| | | | | |
|---|---|---|---|---|
| 511,272 A | * | 12/1893 | Hughes | 119/452 |
| 3,561,757 A | | 2/1971 | Schillig | 272/60 |
| D228,537 S | | 10/1973 | Jennings | D6/79 |
| D257,292 S | | 10/1980 | Brown | D30/41 |
| 4,301,766 A | | 11/1981 | Piccone | 119/482 |
| 4,347,807 A | | 9/1982 | Reich | 119/499 |
| D270,297 S | | 8/1983 | Lovitt | D30/1 |
| 4,599,829 A | * | 7/1986 | DiMartino, Sr. | 52/79.7 |
| D298,577 S | | 11/1988 | Faxon | D30/108 |
| 4,966,097 A | * | 10/1990 | Rosenberger | 119/482 |
| D335,002 S | | 4/1993 | Read | D11/145 |
| 5,315,965 A | * | 5/1994 | Davis | 119/201 |
| D349,783 S | | 8/1994 | Berger | D30/108 |
| D371,641 S | | 7/1996 | Crowley | D30/108 |
| 5,711,253 A | | 1/1998 | Phillips et al. | 119/706 |
| 5,964,189 A | | 10/1999 | Northrop | 119/482 |
| 6,058,887 A | | 5/2000 | Silverman | 119/609 |
| 6,123,047 A | * | 9/2000 | Sakai | 119/452 |
| D443,956 S | | 6/2001 | Rudnick | D30/108 |
| 2002/0058690 A1 | * | 5/2002 | Li et al. | 514/422 |

* cited by examiner

Primary Examiner—Robert P. Swiatek
(74) Attorney, Agent, or Firm—Brian S. Steinberger; Law Offices of Brian S. Steinberger, P.A.

(57) ABSTRACT

Habitats for housing and displaying animals having compartments stacked and/or side-by-side. Walls and doors can be plastic, acrylic, laminate, and glass. Doors walls, and floors can be see-through, and/or colored allow. Letters can spelling "CATS" can be mounted to walls form ledges, crevices, hiding spaces. Geometrical shapes such as circles, squares, rectangles, and triangles are mounted and/or freestanding to allow changing, and/or cleaning. Side compartments allow animals to be hidden. Doors, and drawers can store food, blankets and toys. Gaps allow for ventilation and/or air exchange. Space under the shapes allow for cleaning and/or for using litter boxes.

38 Claims, 16 Drawing Sheets

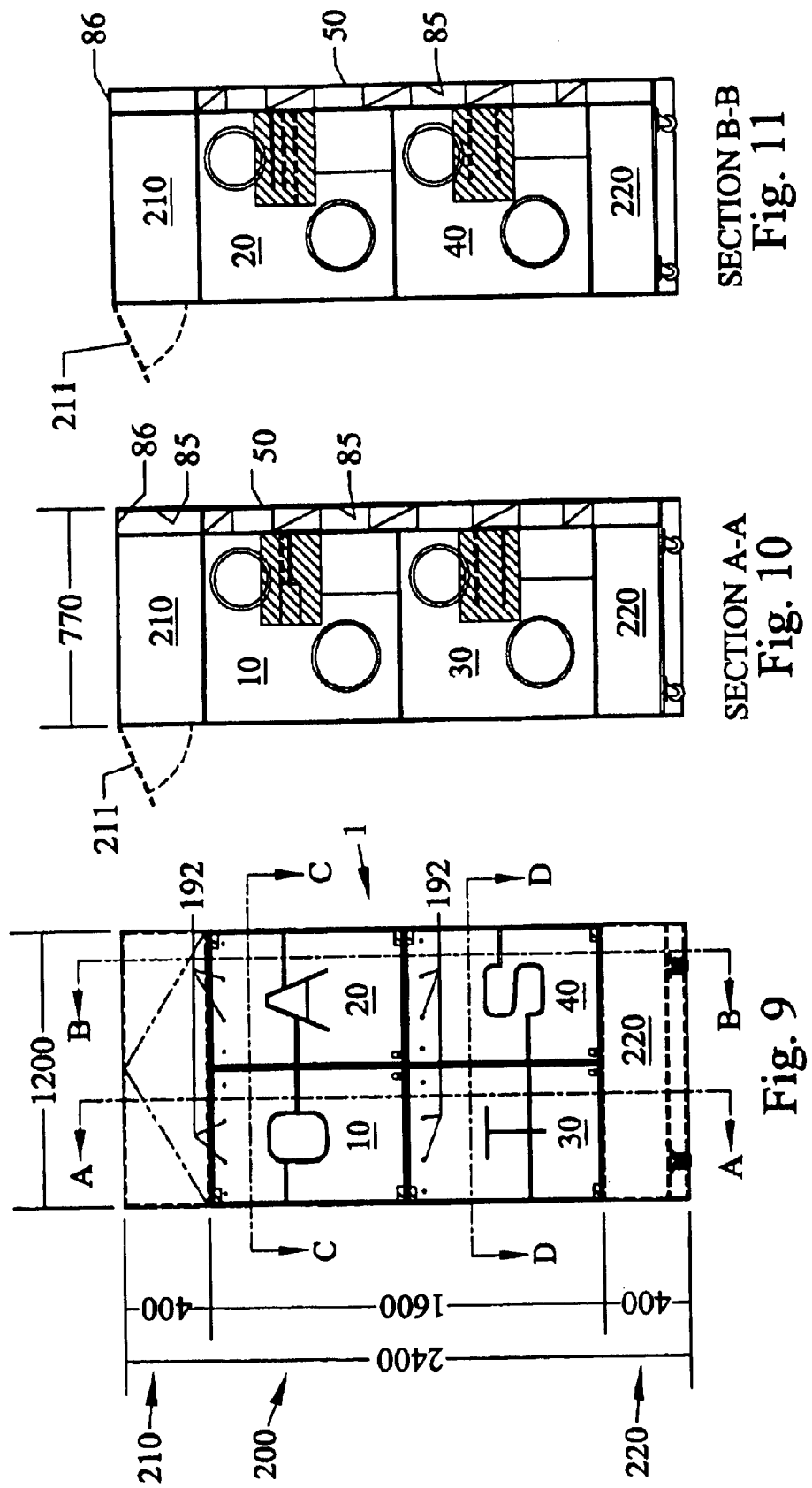

SECTION D-D

SECTION C-C

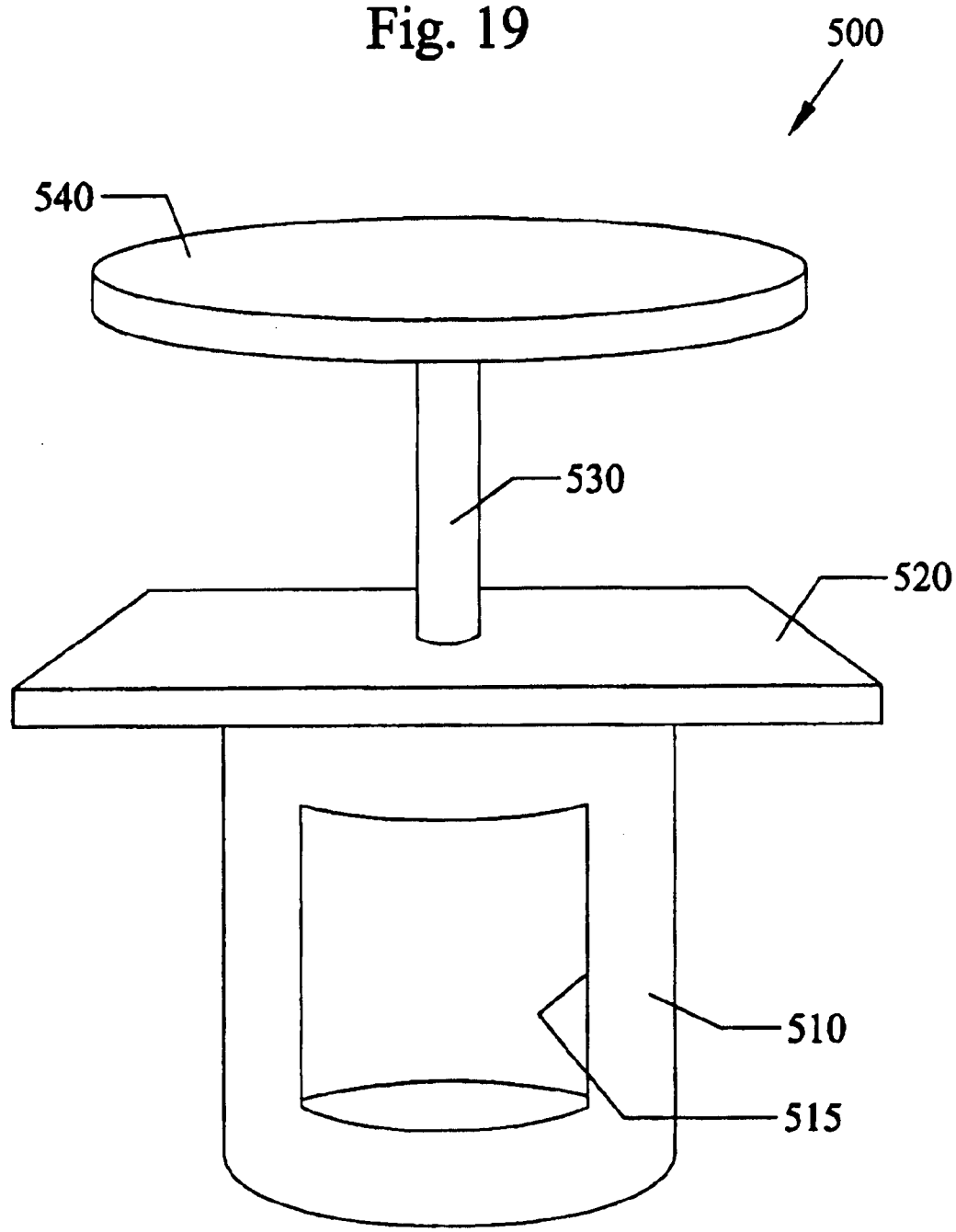

CHESHIRE CAT HOUSE

This invention claims the benefit of priority to U.S. Provisional Application 60/459,799 filed Apr. 2, 2003, and this invention is a Continuation-In-Part of U.S. Des. patent application Ser. No. 29/156,032 filed Feb. 25, 2002, now U.S. Pat. No. Des. 476,780, which claims the benefit of priority to United Kingdom Design Application No. 2106757 filed Dec. 7, 2001.

FIELD OF INVENTION

This invention relates to pets, in particular to aesthetic, comfortable, and ergonomic habitats and methods for displaying, and accommodating small animals such as cats, and dogs, and rabbits, and the like, in commercial businesses and residences.

BACKGROUND AND PRIOR ART

Pet stores and humane society environments are well known to display small animals in cages that typically contain wire mesh floors and walls. To patrons who visit these establishments, these cages often appear unsightly and undesirable. The resulting appearance of small cages individually or stacked together can be depressing sights to visitors of the sites.

The cages can be difficult to clean and sanitize since animal waste from upper cages can drop through the wire mesh floors to cages stacked underneath the cages. Additionally, a cage located directly on a floor must be physically moved in order to adequately clean beneath it. Furthermore, it is clearly difficult to easily clean all exterior surface sides of the individual wires in the mesh type floors, walls, and ceiling of the traditional cages without having to wipe directly about each of the wires.

Single and stacked cages generally placed directly on flat surfaces must be manually lifted in order to be moved. Often, the animals must be removed from the cages so that the cages can be moved to different locations, which also results in the uncomfortable and time consuming displacement of the animals during the move.

Additionally, the animals inside these cages often appear unhappy and unrelaxed as well as bored. The animals can have little comfort in having to sit and/or walk and/or stand on wire type mesh floors, and the like.

Adoption of the animals stored and displayed in these cages can be hindered because of the unhappy and unrelaxed state of the animals, as well as the depressing, unsightly and undesirable appearances of traditional storage cages at these pet stores and humane society environments.

The cages have little or no privacy since the cages are wide open. Additionally, traditional cages are so small that they allow for little movement of the animals or the cages are so confined that many small animals must stay in either a fixed position or restricted space within the cages. Thus, the traditional cages contribute to atrophy effects in the animals.

Various types of pet type houses have been proposed over the years. See for example, U.S. Pat. Nos. Des. 228,537 to Jennings; Des. 257,292 to Brown; Des. 270,297 to Lovitt; Des. 298,577 to Faxon; Des. 349,783 to Berger; Des. 335,002 to Read et al.; Des. 371,641 to Crowley; D443,956 to Rudnick; 3,561,757 to Schillig; 4,301,766 to Piccone; 4,347,807 to Reich; 5,711,253 to Phillips et al.; 5,964,189 to Northrop et al.; and 6,058,887 to Silverman.

Jennings '537; Faxon '577; Northrop '189 and Silverman '887 each shows structures include box type structures with openings for mostly single animals that does not allow for safely storing and confining the animals within the structures. Schillig '757; Piccone '766; Reich '807; and Phillips et al. '253 each show plural block arrangements each with openings which appear to be used primarily as open playgrounds and/or constant open storage containers for pets.

Brown '292 and Berger '783 each shows pedestal/stand supported obtrusive structures with specific height requirements that clearly wastes space between the "modular house." Lovitt '297 shows a multi-tiered interconnected display with stairs and rotating wheel that appears to be no more than an enlarged gerbil type cage. Read et al. '002 shows a see-through structure resembling a little house with wide open spaces offering no privacy to the animals. Rudnick '956 shows an animal habitat requiring tube connected blocks that clearly requires large amounts of space.

These depicted structures are generally not built for the comfort of the pets being stored. Additionally, none of these proposed houses are easily adaptable for aesthetically displaying and safely housing several or more small pets, such as cats in a specific space, such as in a pet store. The above devices are also generally not mobile, and instead must be physically disassembled in order to be moved.

Thus, the need exists for solutions to the above problems with the prior art.

SUMMARY OF THE INVENTION

The first objective of the present invention is to provide an enclosed habitat and method for housing and displaying small animals such a cats, that is aesthetically pleasing to one viewing the small animals.

The second objective of the present invention is to provide an enclosed habitat and method for housing and displaying small animals such a cats, that is comfortable to small animals.

The third objective of the present invention is to provide an enclosed habitat and method for housing and displaying small animals such as cats, that eliminates the use of undesirable and unsightly cages and wire meshes.

The fourth objective of this invention is to provide an enclosed habitat and method for housing and displaying small animals such a cats that can be used in commercial establishments such as pet stores.

The fifth objective of the present invention is to provide an enclosed habitat and method for housing and displaying small animals such a cats that can be used in humane society environments.

The sixth objective of the present invention is to provide an enclosed habitat and method for housing and displaying small animals such as cats, that can be large enough to allow for the animals to move about and not be confined in fixed positions.

The seventh objective of the present invention is to provide an enclosed habitat and method for housing and displaying small animals such as cats, that allows for areas that the animals can go to that are out of sight and offer some privacy effects to the animals.

The eighth objective of the present invention is to provide an enclosed habitat and method for housing and displaying small animals such a cats, that results in the animals being in a more relaxed and happy state.

The ninth objective of the present invention is to provide an enclosed habitat and method for housing and displaying small animals such a cats, that results in the animals being livelier and less bored.

The tenth objective of the present invention is to provide an enclosed habitat and method for housing and displaying small animals such a cats, that results in the positive, playful natural animals being more desirable for adoption.

The eleventh objective of the present invention is to provide an enclosed habitat and method for housing and displaying small animals such a cats, that results in brighter environments that make it more desirable for animal adoption.

The twelfth objective of the present invention is to provide an enclosed habitat and method for housing and displaying small animals such as cats, that both safely contains the animals while allowing for cross-airflow ventilation therethrough.

The thirteenth objective of the present invention is to provide an enclosed habitat and method for housing and displaying small animals such as cats, that is both ergonomic and safe and practical for viewing, displaying and housing small animals such as cats.

The fourteenth objective of the present invention is to provide an enclosed habitat and method for housing and displaying small animals such as cats, that can be easily moved without requiring the manual lifting and/or disassembly of the houses and habitats and/or removal of the animals for the move.

The fifteenth objective of the present invention is to provide an enclosed habitat and method for housing and displaying small animals such as cats, that can be easily cleaned and sanitized.

Habitat housing apparatus and methods of using habitats for safely accommodating, displaying, and housing small animals such as cats, and the like. Compartments can include cageless walls, floors, and ceilings, that are either or both stacked or arranged in side-by-side arrangements. The compartments can be formed from plastics, acrylics, glass, safety glass, and the like, and have see-through front doors. On rear walls of the compartments can be letters, and/or geometrical shapes having different colors than the surrounding surfaces so as to give the illusion of the letters and/or shapes being suspended in the air. The letters and/or geometrical shapes can be arranged so as spell out words such as CATS with different colors.

The letters and/or shapes can be fixably mounted inside individual compartments. Alternatively, or in combination the letters and/or geometrical shapes can be free-standing so as to be easily removable from the compartments. Space beneath the letters and geometrical shapes allows for easy cleaning inside the compartments and for allowing removable litter type boxes to be placed therein.

The compartments can include extra storage such as drawers and/or hinged boxes for allowing supplies to be stored with the compartments. The compartments can be easily movable by having wheels underneath the compartments.

Portal openings in the sides, floors, and/or ceiling of the compartments can allow for the animals to travel back and forth as desired. Additional private compartments can allow for the animals to move out of sight by passing through the portals.

Further objects and advantages of this invention will be apparent from the following detailed description of presently preferred embodiments which are illustrated schematically in the accompanying drawings.

BRIEF DESCRIPTION OF THE FIGURES

FIG. 9 is a front view of a second embodiment of the novel animal habitat.

FIG. 10 is a side cross-sectional view of the embodiment of FIG. 9 along arrows A—A.

FIG. 11 is a side cross-sectional view of the embodiment of FIG. 9 along arrows B—B.

FIG. 19 is a perspective view of an additional novel shape that can be used with the embodiments of the preceding figures.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The novel invention habitats results in happier and more relaxed animals. When used in pet stores and/or humane society environments, the novel habitats have a positive affect on adoption, membership and sponsorship of the animals housed in these habitats.

Mobile enclosure specifically configured for cats, uses principals of playfully shaped, colored cat houses, where choices of materials, location sizes and enclosure configurations are chosen to cause optimum comfort to the animals and physical and visual connectivity to visitors of the enclosures.

Materials forming the enclosures can be made from durable, cleanable materials, such as but not limited to plastics, acrylics, laminate, and the like, and combinations thereof. Additional materials can include plate glass, safety glass, and the like, and combinations, thereof. Each compartment in the enclosure can be used individually or interconnected both horizontally and vertically to other compartments. The various changes in level within each compartment/unit provide interest to the animals, such as the cats, whilst gazing between each compartment/unit allows greater visual connection, which can relieve boredom. Various high and low level cabinets/compartments/units can provide storage for food and blankets.

Mobile units can also be linked to provide a flexible array of stimulating accommodation that will brighten animal establishments such as pet's stores and humane society environments for both the animals and humans.

First Embodiment

Figure 1:
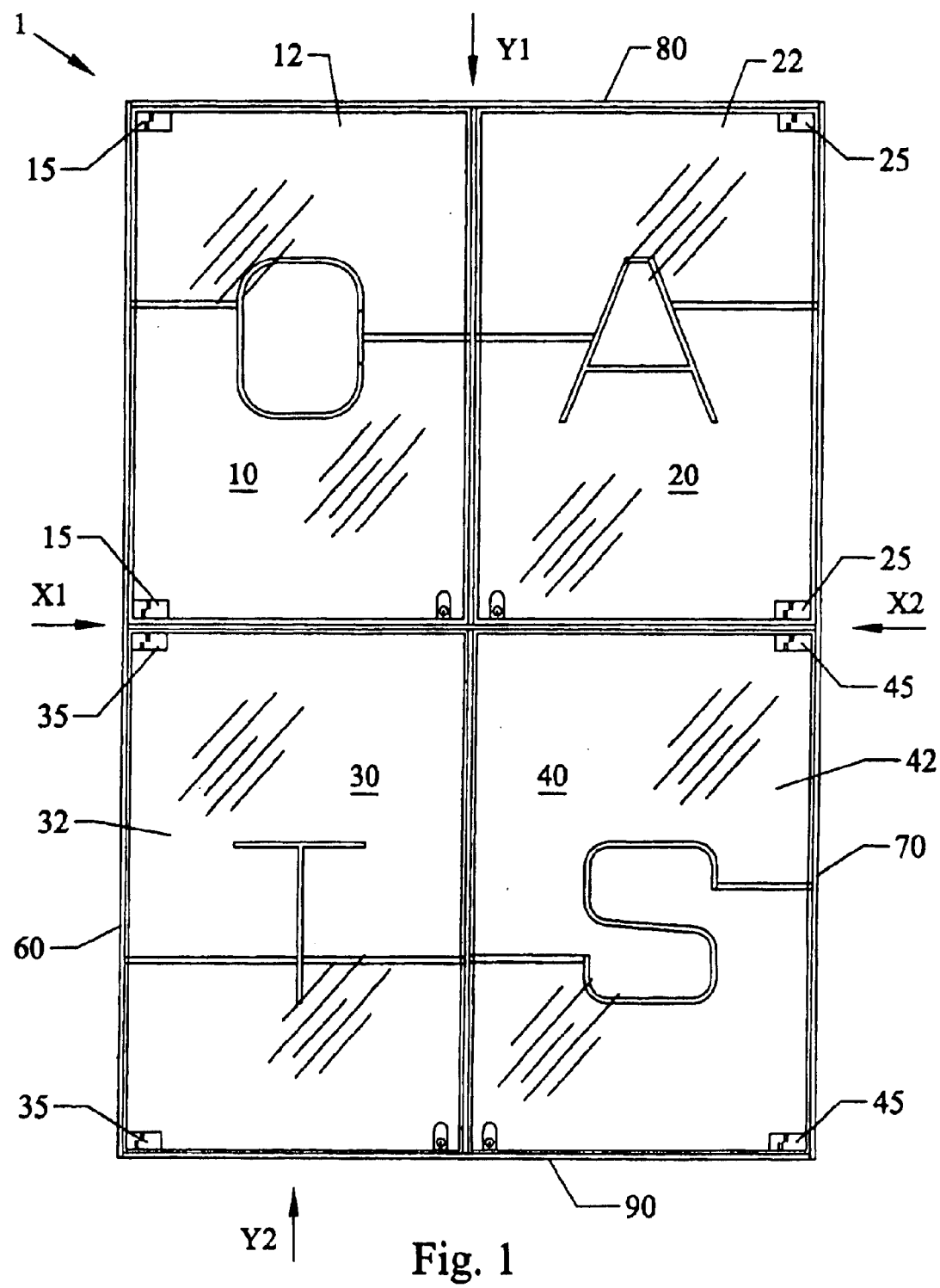
FIG. 1 is a front view of a first preferred embodiment of the novel animal habitats.
Figure 2:
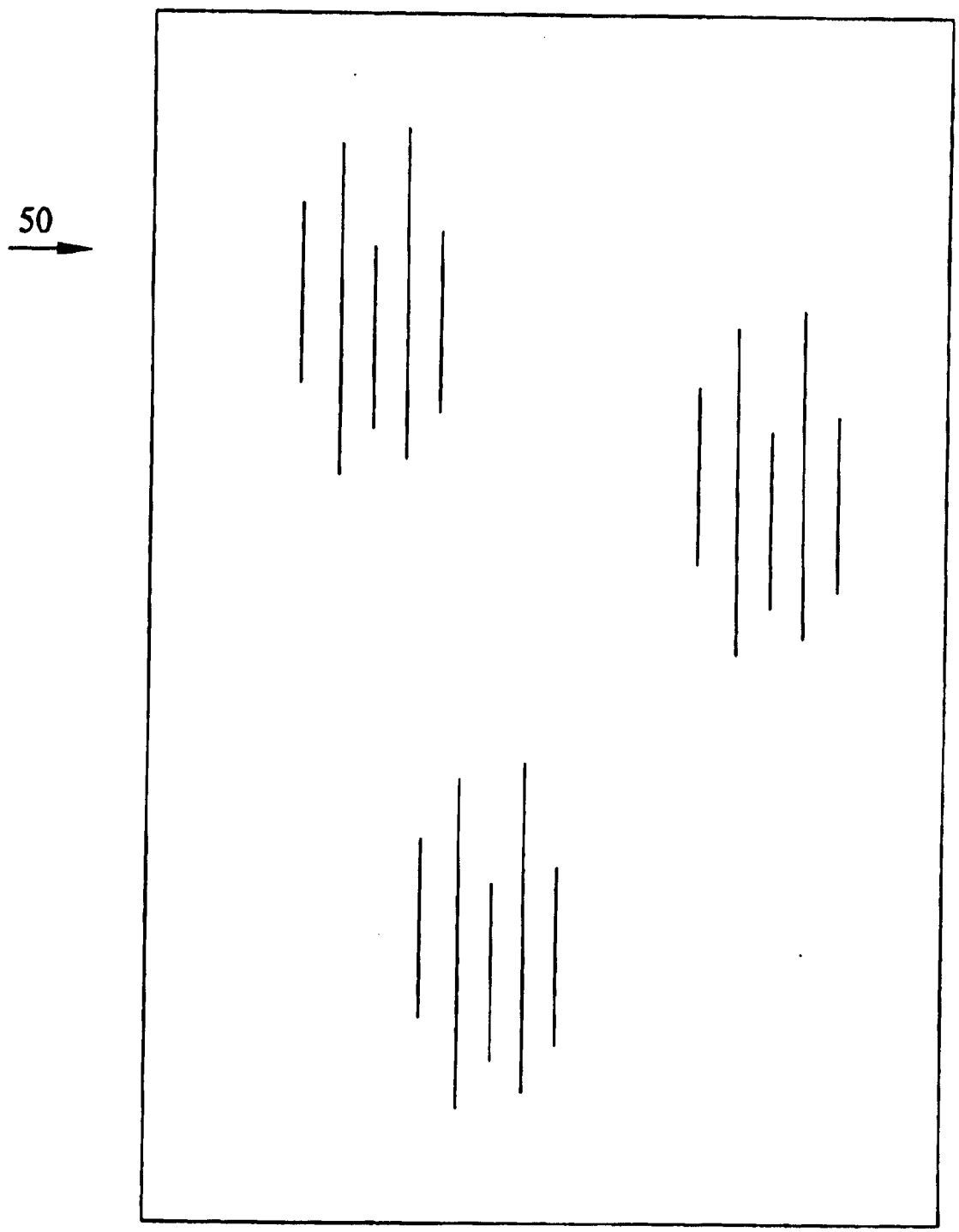
FIG. 2 is a rear view of the embodiment of FIG. 1.

FIG. 1 is a front view of a first preferred embodiment of the novel animal habitats which shows four compartments 10, 20, 30, and 40 stacked on top of one another with common left sidewall 60, right sidewall 70, rear wall 50, top wall 80 and bottom floor 90. Each of the four compartments can have see-through cageless doors 12, 22, 32, and 42 attached by side mounted hinges 15, 25, 35, and 45 to respective sidewalls 60 and 70, respectively. The see-through doors 12, 22, 32, 42 can be made from plastics, acrylics, laminate, and the like, and combinations thereof, plate glass, safety glass, and combinations, thereof. The hinges 15, 25, 35, 45 can be metal or reinforced plastic to allow the left doors 12, 32 to open to the left of the embodiment 1, while right doors 22, 42 can open outward to the right of the embodiment 1. FIG. 2 is a rear view of the back wall 50 of the embodiment of FIG. 1, which can be a solid panel that can be formed from similar materials such as those of the front see-through doors 12, 22, 32, 42. In the preferred embodiment the back wall panel 50 can be opaque such as white, and the like.

Figure 3:
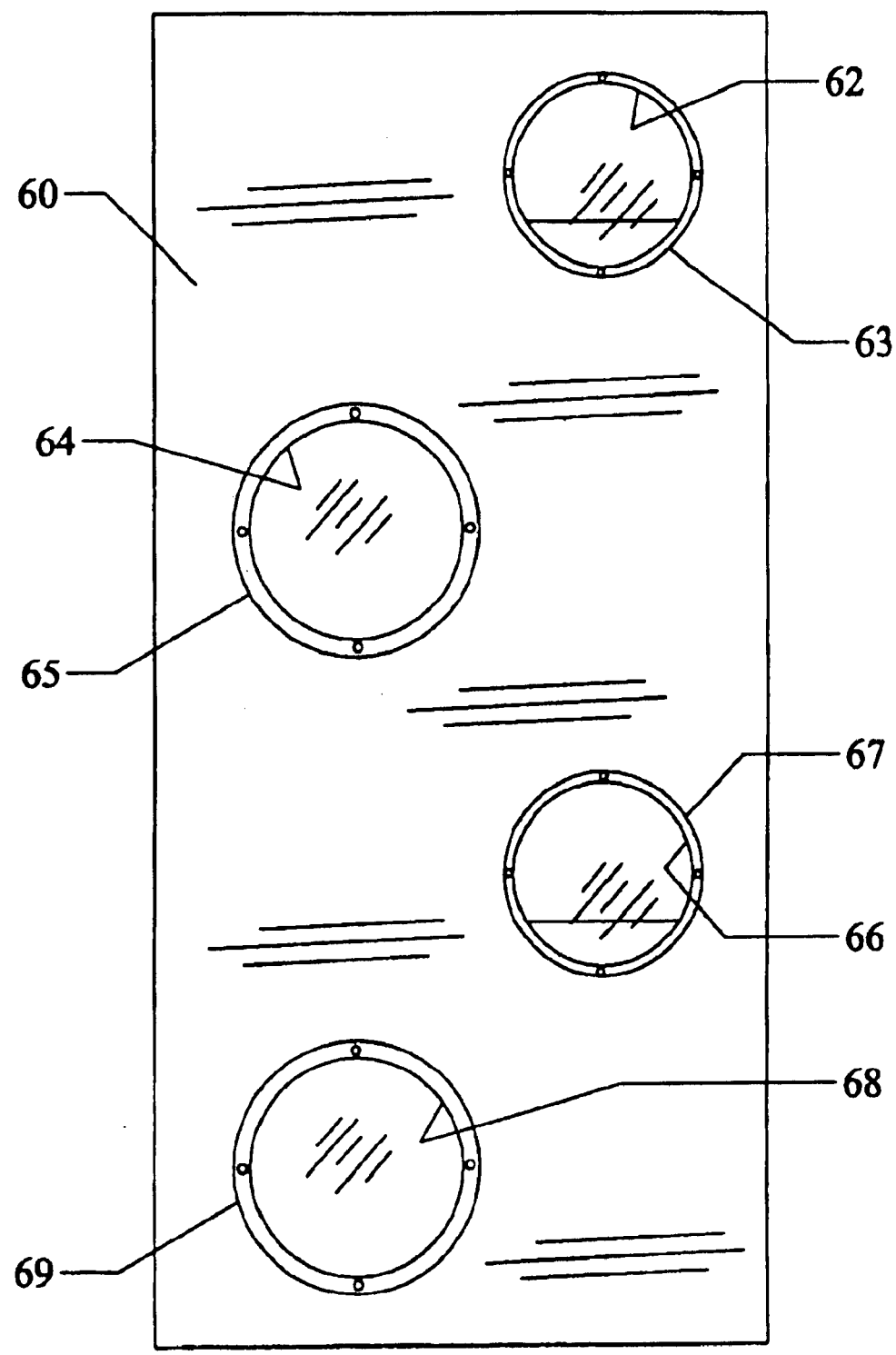
FIG. 3 is a left side view of the embodiment of FIG. 1.
Figure 4:
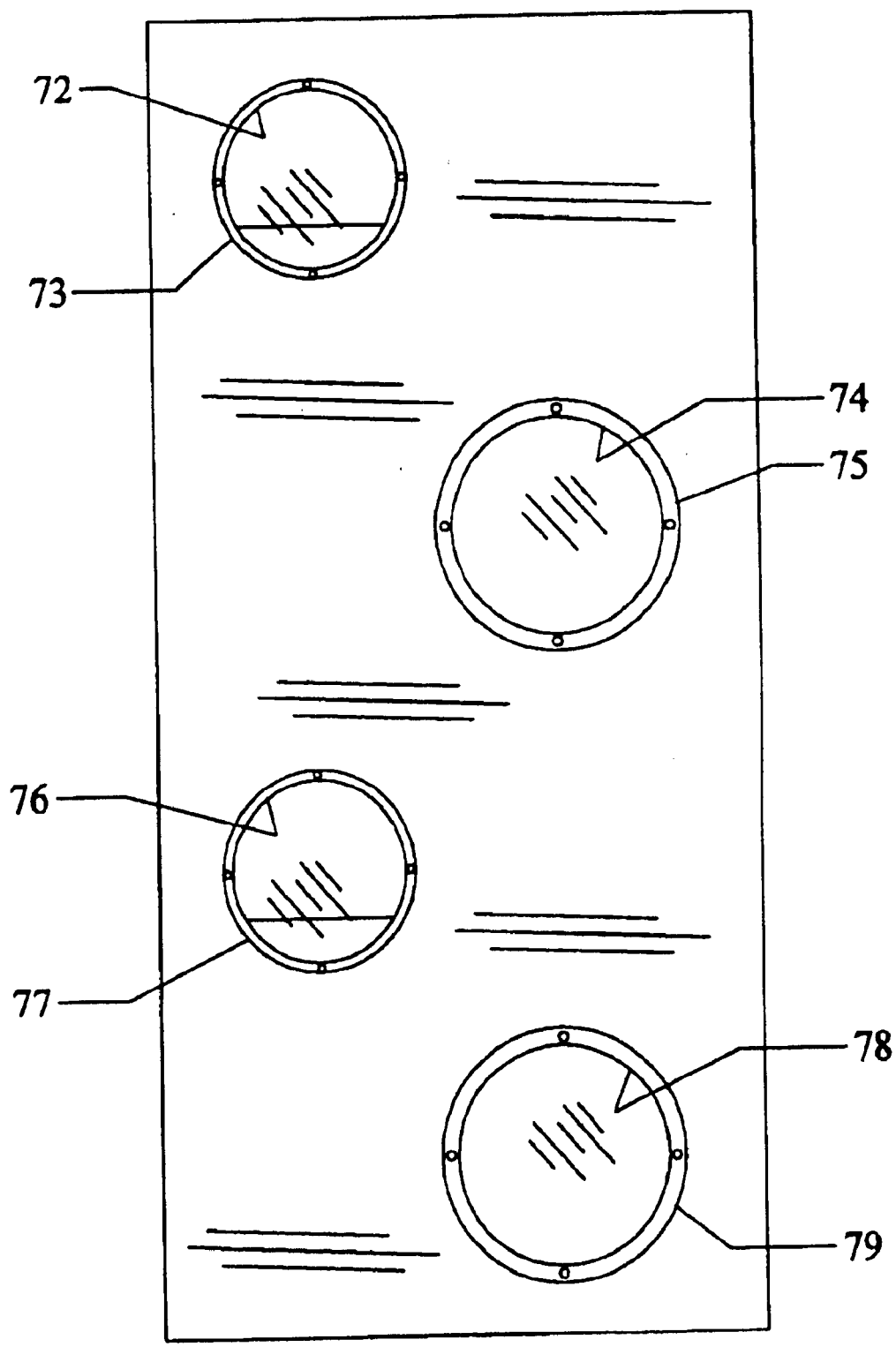
FIG. 4 is a right side view of the embodiment of FIG. 1.

FIG. 3 is a left side view of left sidewall 60 of the embodiment 1 of FIG. 1 along arrow X1. FIG. 4 is a right side view of the right sidewall 60, 70 of the embodiment 1 of FIG. 1 along arrow X2. The sidewalls 60, 70 can be formed from similar materials to that of the see-through front doors 12, 22, 32, 42 and rear wall 50. The sidewalls 60, 70 can include portal openings 62, 64, 66, 68, 72, 74, 76, and 78 that can be closed off with disc covers 63, 65, 67, 69, 73, 75, 77, 79 that can be screwed onto the sidewalls 60, 70. Alternatively, flap covers such as rubberized mat covers, can be used with or instead of the screwable covers to allow access through the circular portals as needed.

In the preferred embodiment, the sidewalls 60, 70 can have an opaque color such as but not limited to white, while the removable disc covers 63, 65, 67, 69, 73, 75, 77 and 79 are see-through, so that outsiders can look directly into the compartments 10, 20, 30, 40. The side portals can be arranged in zig zag patterns of circular openings, and the like, which can allow for additional access into interiors of the compartments 10, 20, 30, 40.

Figure 5:
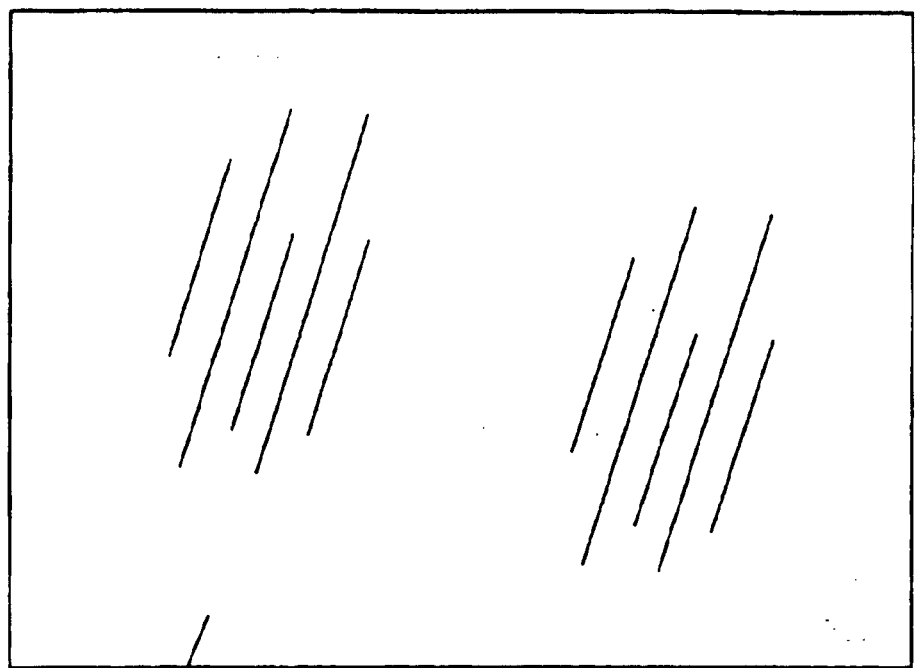
FIG. 5 is a top view of the embodiment of FIG. 1.
Figure 6:
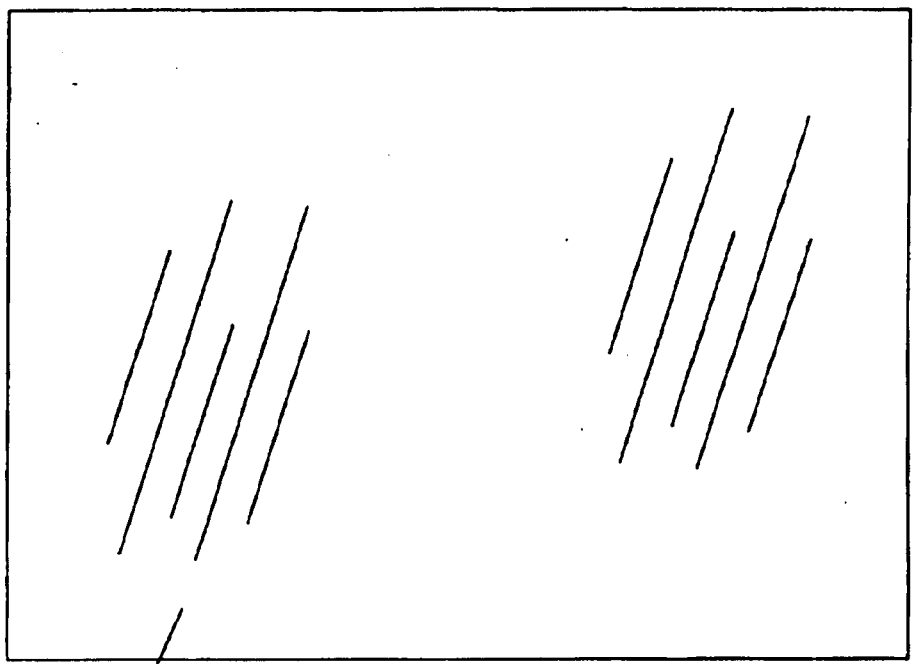
FIG. 6 is a bottom view of the embodiment of FIG. 1.

FIG. 5 is a top view of the top panel 80 of the embodiment 1 of FIG. 1 along arrow Y1. FIG. 6 is a bottom view of the floor panel 90 of the embodiment 1 of FIG. 1 along arrow Y2. The top panel 80 and bottom panel 90 can be formed from the same materials as those previously described. In the preferred embodiment, these panels can be opaque such as using the color white, and the like.

Figure 7:
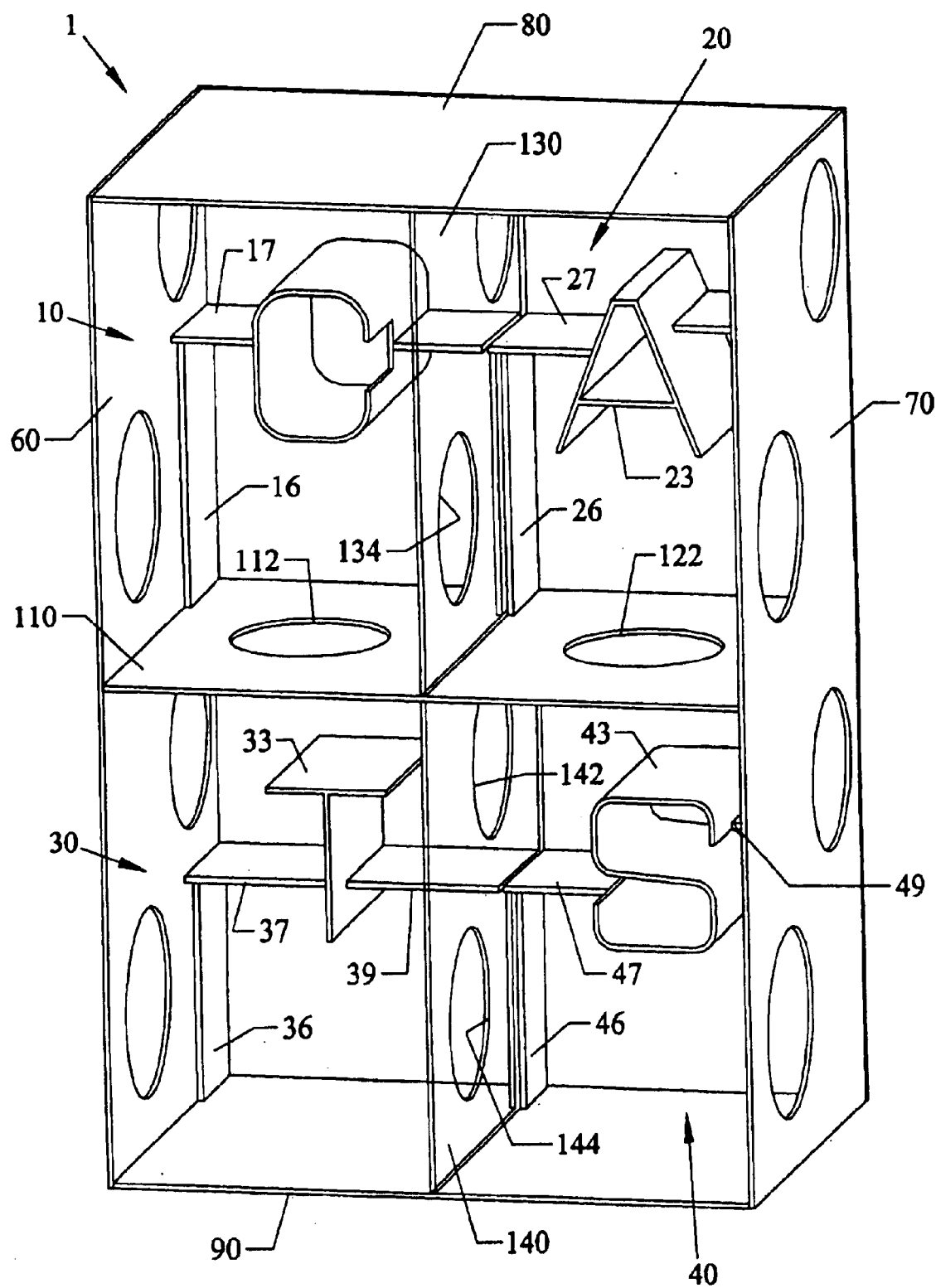
FIG. 7 is a right front perspective view of the embodiment of FIG. 1 with front doors off.
Figure 8:
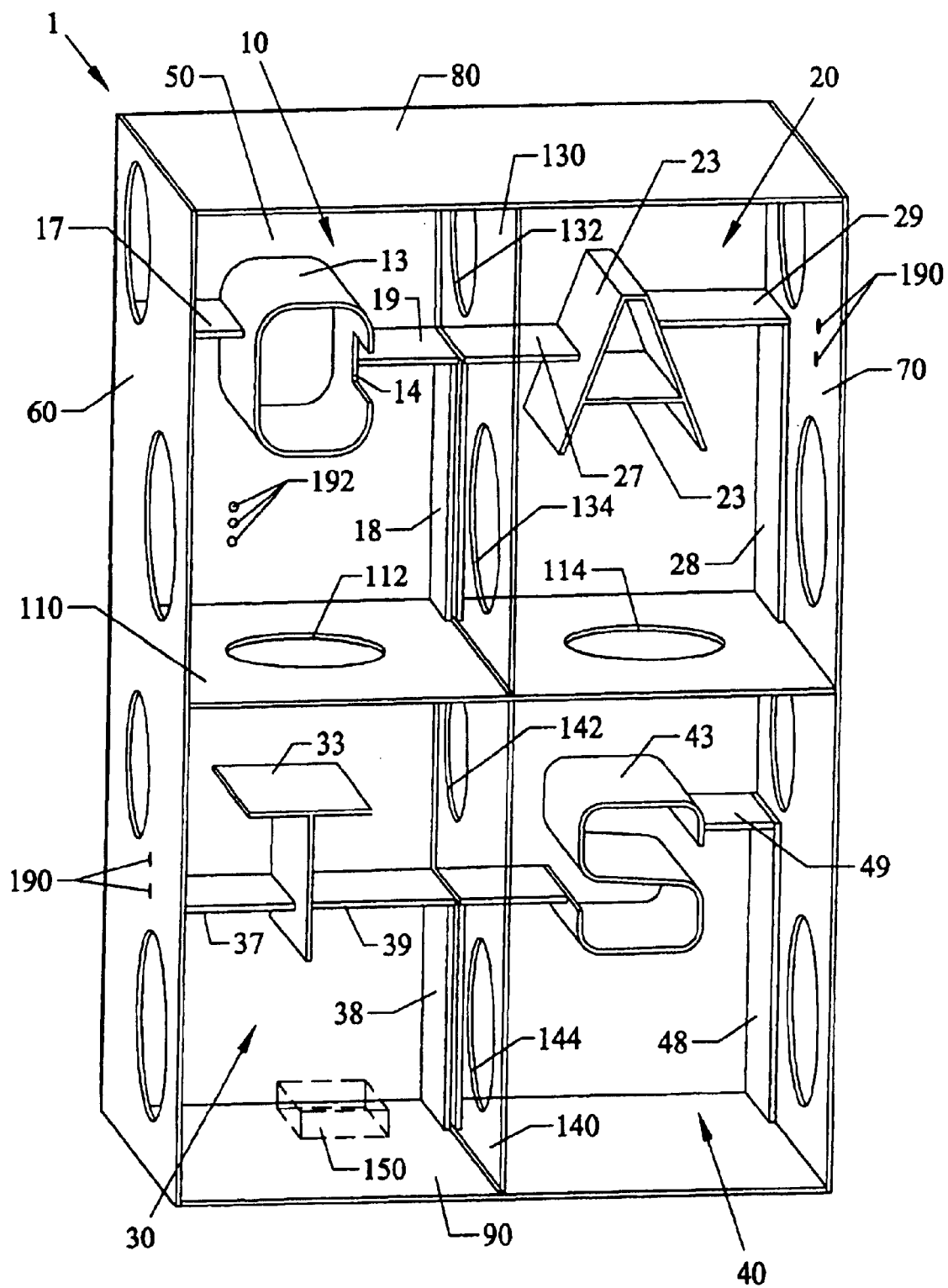
FIG. 8 is a left front perspective view of the embodiment of FIG. 1 with front doors off.

FIG. 7 is a right front perspective view of the embodiment 1 of FIG. 1 with front doors 12, 22, 32 and 42 removed. FIG. 8 is a left front perspective view of the embodiment 1 of FIG. 1 with the front doors 12, 22, 32 and 42 removed. The upper compartments 10, 20 can be separated from the lower compartments 30, 40 by a common floor panel 110, which can also include portal openings 112, 122 for ventilation and for allowing the small animals inside to easily move from one compartment to another. The upper compartments 10, 20 can be separated from one another by an upper dividing wall panel 130 that also can have portal openings 132, 134 for ventilation and for allowing the small animals to pass therethrough. Similarly, the lower compartments 30, 40 can be separated from one another by a lower dividing wall panel 140 that also can have portal openings 142, 144 for ventilation and for allowing the small animals to pass therethrough. The arrangement of portal openings 132, 134, 142, 144 can also be arranged in zig zag patterns similar to the other portal openings previously described.

In a preferred embodiment the floor panel 110 and dividing wall panels 130, 140 can be formed from a see-through material such as those described previously.

The interior portal openings 112, 114, 132, 134, 142, 144 in floor panel 110, and dividing walls 130, 140 can also include selected covers and flaps such as those previously described in order to selectively limit passage between the compartments 10, 20, 30 and 40.

In the first preferred embodiment, each compartment can include fixably mounted raised shapes such as letters, formed from the same materials as those previously described.

In first compartment 10, the letter C 13 can be formed from an oblong tubular shaped materials such as those previously described that resembles the capital O with a front cut-out portion 14 that can be surface coated with the same color as the rear wall 50 of the embodiment 1, such that using a color such as red for the letter against the white rear wall 50 with the cut-out 14 creates the illusion of the letter C in compartment 10. The C shape can be fixably mounted by an adhesive, and the like, to left L-shaped goal post 16, 17 and right L-shaped goal post 18, 19, where the goal posts are similarly attached to both the rear wall 50 and interior surfaces of the side walls 60 and 130 by adhesives and the like. In the preferred embodiment 1, the goal posts 16–17 and 18–19, can be formed from materials similar to those previously described but having a different color than that of the letter shape C 13. For example, using white for the goal posts 16–17, 18–19 further enhances the illusion of the letter C floating in midspace inside the compartment 10.

In second compartment 20 the letter A 23 can be formed from several materials such as those previously described that resembles the letter A having a color that is different than that of the rear wall 50 of the embodiment 1, such that using a color such as green for the letter against the white rear wall 50 creates the illusion of the letter A in compartment 20. The A shape can be fixably mounted by an adhesive, and the like, to left L-shaped goal post 26, 27 and right L-shaped goal post 28, 29, where the goal posts are similarly attached to both the rear wall 50 and interior surfaces of the side walls 70 and 130 by adhesives and the like. In the preferred embodiment 1, the goal posts 26–27 and 28–29, can be formed from materials similar to those previously described but having a different color than that of the letter shape A 23. For example, using white for the goal posts 26–27, 28–29 further enhances the illusion of the letter A floating in midspace inside the compartment 20.

In third compartment 30 the letter T 33 can be formed from crossed materials such as those previously described that resembles the letter T having a color that is different than that of the rear wall 50 of the embodiment 1, such that using a color such as blue for the letter against the white rear wall 50 creates the illusion of the letter T in compartment 30. The T shape can be fixably mounted by an adhesive, and the like, to left L-shaped goal post 36, 37 and right L-shaped goal post 38, 39, where the goal posts are similarly attached to both the rear wall 50 and interior surfaces of the side walls 60, 140 by adhesives and the like. In the preferred embodiment 1, the goal posts 36–37 and 38–39, can be formed from materials similar to those previously described but having a different color than that of the letter shape T 33. For example, using white for the goal posts 36–37, 38–39 further enhances the illusion of the letter T floating in midspace inside the compartment 30.

In fourth compartment 40 the letter S 43 can be formed from materials such as those previously described that resembles the letter S having a color that is different than that of the rear wall 50 of the embodiment 1, such that using a color such as yellow for the letter against the white rear wall 50 creates the illusion of the letter S in compartment 40. The S shape can be fixably mounted by an adhesive, and the like, to left L-shaped goal post 46, 47 and right L-shaped goal post 48, 49, where the goal posts are similarly attached to both the rear wall 50 and interior surfaces of the side walls 70 and 140 by adhesives and the like. In the preferred embodiment 1, the goal posts 46–47 and 48–49, can be formed from materials similar to those previously described but having a different color than that of the letter shape S 43. For example, using white for the goal posts 46–47, 48–49 further enhances the illusion of the letter S floating in midspace inside the compartment 40.

The goal posts in the above compartments can also be formed from and use different colors than the sidewalls and rear walls of the compartments as long as the visual appearance of the letters inside the compartments are readable from outside.

Furthermore, the goal posts and/or the letter shapes can be formed from clear materials, various colored materials, and the like, such as but not limited to red, yellow, orange, green, blue, brown, grey, and black, and the like, variations thereof, and combinations thereof.

The letter shapes and goalposts inside the compartments are shaped so that portions of the letter shapes and goal posts function as ledges, and small interior compartment spaces, crevices, and the like, for the small animals, such as cats, and the like, to sit on, relax and rest within, and the like.

Additional materials can be used as ledges across each compartment as further spaces for the animals to climb to, rest, and relax thereon, and the like.

Ventilation openings 190 can be selectively located through sidewalls and rearwalls of the embodiment as needed to allow for cross-ventilation into the compartments. The ventilation openings can be large enough to allow airflow but small enough so that animals cannot pass therethrough. Additionally gaps around each of the front door panels and rows of small holes 192 in the rear or each compartment can be used for ventilation, and function as flue openings in the rear to allow for natural ventilation and/or substantial air exchange between the housings and ambient air.

Beneath each of the letter shapes in the compartments are spaces large enough for allowing easy cleaning of the floor surfaces 110, 90. Additionally, the spaces below the letter shapes allow for storing and removing additional items such as litter boxes 150. The additional items such as the litter boxes can also be made from materials that are used in the embodiment, and can also have different colors to add in the visual effect of the embodiment 1.

Second Embodiment

Figure 13:
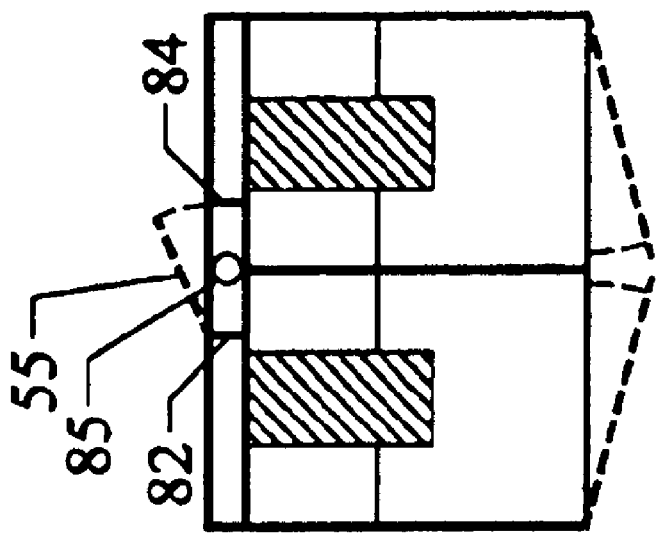
FIG. 13 is a top cross-sectional view of the embodiment of FIG. 9 along arrows D—D.
Figure 12:
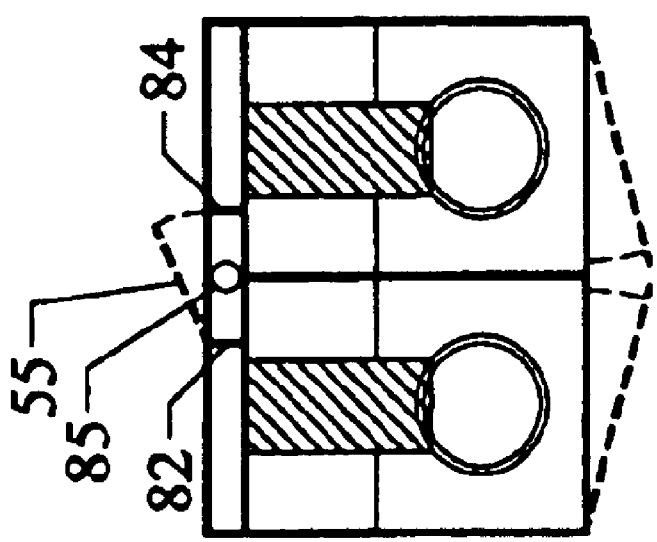
FIG. 12 is a top cross-sectional view of the embodiment of FIG. 9 along arrows C—C.
Figure 14:
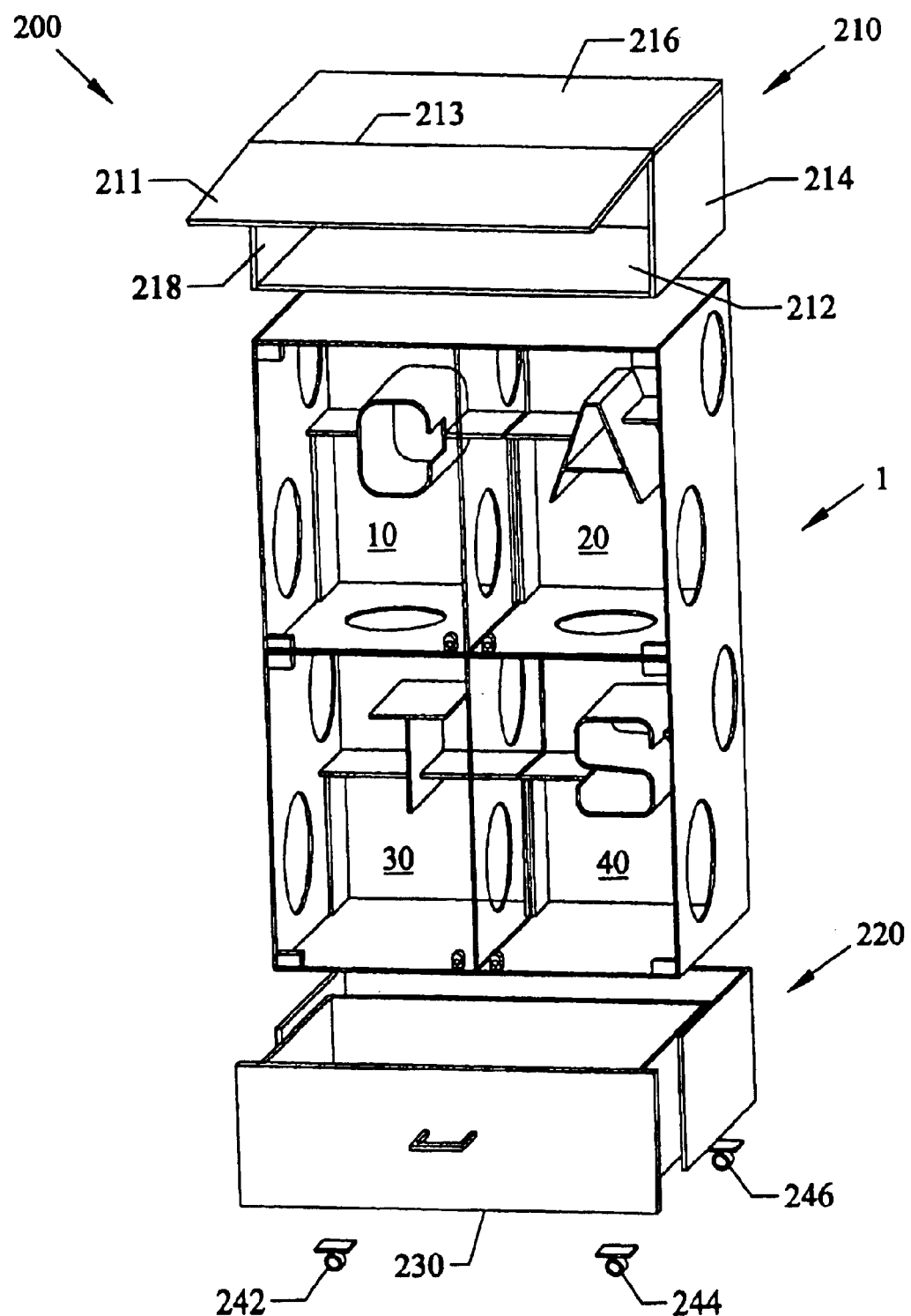
FIG. 14 is a front exploded perspective view of the embodiment of FIG. 9.

FIG. 9 is a front view of a second embodiment 200 of the novel animal habitat. FIG. 10 is a side cross-sectional view of the embodiment 200 of FIG. 9 along arrows A—A. FIG. 11 is a side cross-sectional view of the embodiment 200 of FIG. 9 along arrows B—B. FIG. 12 is a top cross-sectional view of the embodiment 200 of FIG. 9 along arrows C—C. FIG. 13 is a top cross-sectional view of the embodiment 200 of FIG. 9 along arrows D—D. FIG. 14 is a front exploded perspective view of the embodiment 200 of FIG. 9.

Referring to FIGS. 9–14, the second embodiment 200 can include the novel features of the first embodiment 1, and further include separate horizontal rectangular compartments 210 above and below 220 the four main compartments 10, 20, 30, 40. The top horizontal rectangular compartment 210 can include a door 211 that folds up on a hinge 213. Alternatively, the door 211 can fold down by moving the hinge 213 to be attached to the front edge of the floor panel 212 of the compartment 210. Top compartment 210 can have a rectangular shape with sidewall panels 214, 218, floor panel 212 and ceiling panel 216 that can be formed from materials similar to those previously described, and have colors such as those previously described.

The bottom horizontal rectangular compartment 220 can be located beneath the four compartments 10, 20, 30, 40. Bottom compartment can have an open front end that can include a drawer 230 that can be pulled outward by a handle 232 to reveal interior storage space.

These additional compartments 210, 220, 230 can function as cabinets and be used for storing supplies such as but not limited to blankets, food, toys, and the like.

Wheels 242, 244, 246, such as four caster wheels can be mounted underneath the bottom horizontal rectangular compartment 220 to allow the second embodiment habitat 200 to be easily moveable from place to place.

Similar to the preceding embodiment, ventilation openings 190 can be selectively located through sidewalls and rearwalls of the embodiment as needed to allow for cross-ventilation into the compartments. The ventilation openings can be large enough to allow airflow but small enough so that animals cannot pass therethrough. Additionally gaps around each of the front door panels and rows of small holes 192 in the rear or each compartment can be used for ventilation, and function as flue openings in the rear to allow for natural ventilation and/or substantial air exchange between the housings and ambient air. An optional exhaust flue 85 can run from along a midportion of the rearwall 50 the embodiment 200 connecting rear wall ventilation holes 192 to exhaust out a top opening 86 above the embodiment 200. Air can be drawn through all four compartments 10, 20, 30, 40 upward through the flue 85. An extra rear door 55 can be used to access and provide any maintenance to the flue 85. Additionally, the rear door 55 can be used to provide additional access to anyone of the main compartments 10, 20, 30, 40 as needed for cleaning purposes, and the like.

Third Embodiment

Figure 15:
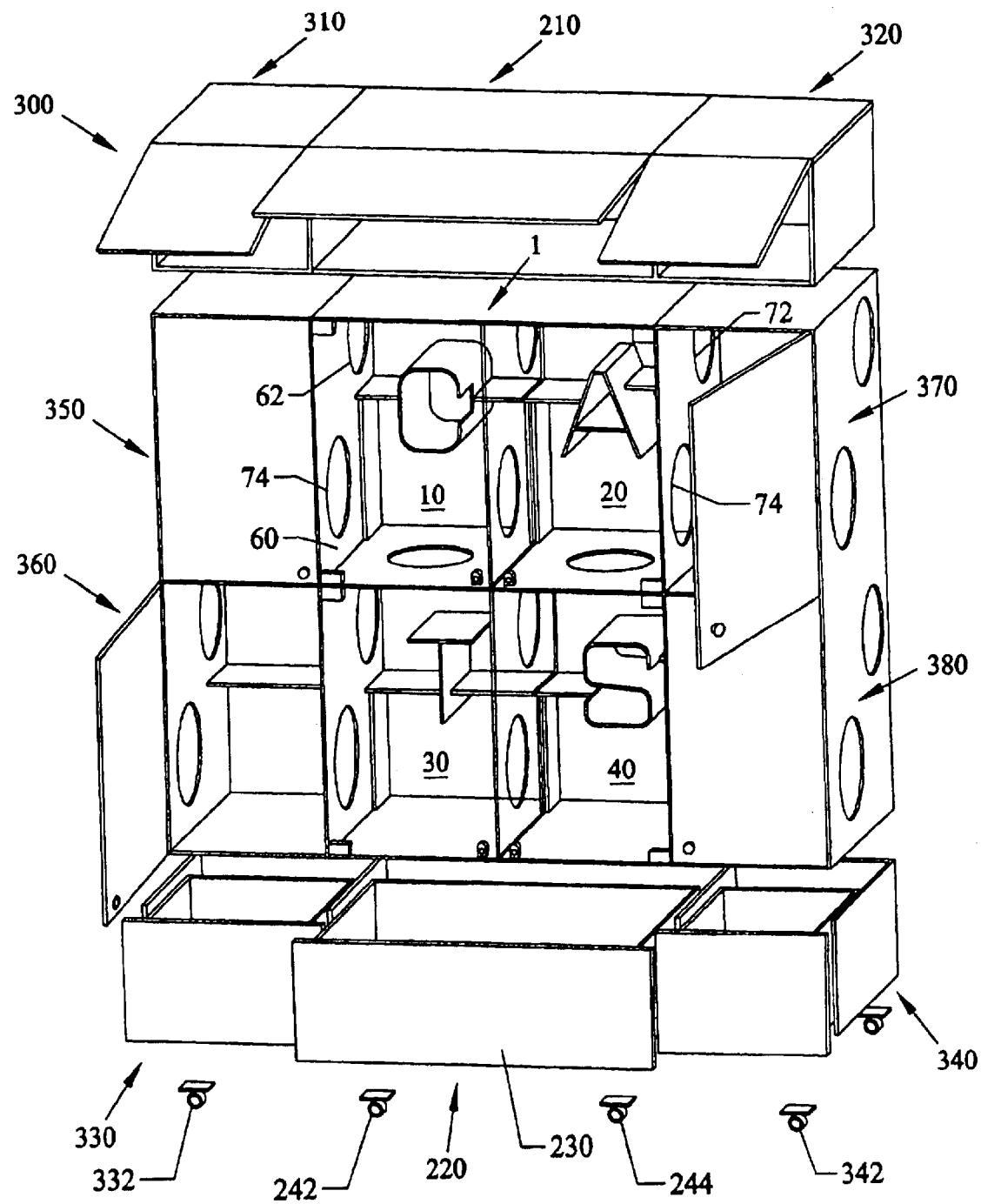
FIG. 15 is a front exploded perspective view of a third embodiment of the animal habitat.

FIG. 15 is a front exploded perspective view of a third embodiment 300 of the animal habitat. The third embodiment 300 can include novel attributes and features of the previous embodiments 1, 200, and further include left and/or right storage closeable opaque door colored enclosed compartments 350, 360, 370, 380, respectively reachable by portals 62, 64, 72, 74 to the main compartments 10, 20, 30, 40 for allowing animals to freely move into these closed spaces to be out of sight, to viewers of the four main compartments 10, 20, 30, 40. Each of the extra left and right compartments 350, 360, 370, 380 can be similar to the main compartments 10, 20, 30, 40, and instead have opaque doors for allowing small animals privacy space that is not visible from in front of the embodiment 300.

Extra upper left compartment 310 and upper right compartment 320 each with hinged doors similar to middle compartment 210, can allow for extra storage space. In addition, extra drawer compartments 330, 340 similar to lower drawer compartment 220 can be located beneath the main compartments, and also allow for extra storage space as needed. Extra wheels 332, 342 such as casters can be used in addition to wheels 242, 244 to allow embodiment 300 to be easily moveable when needed.

Fourth Embodiment

Figure 16A:
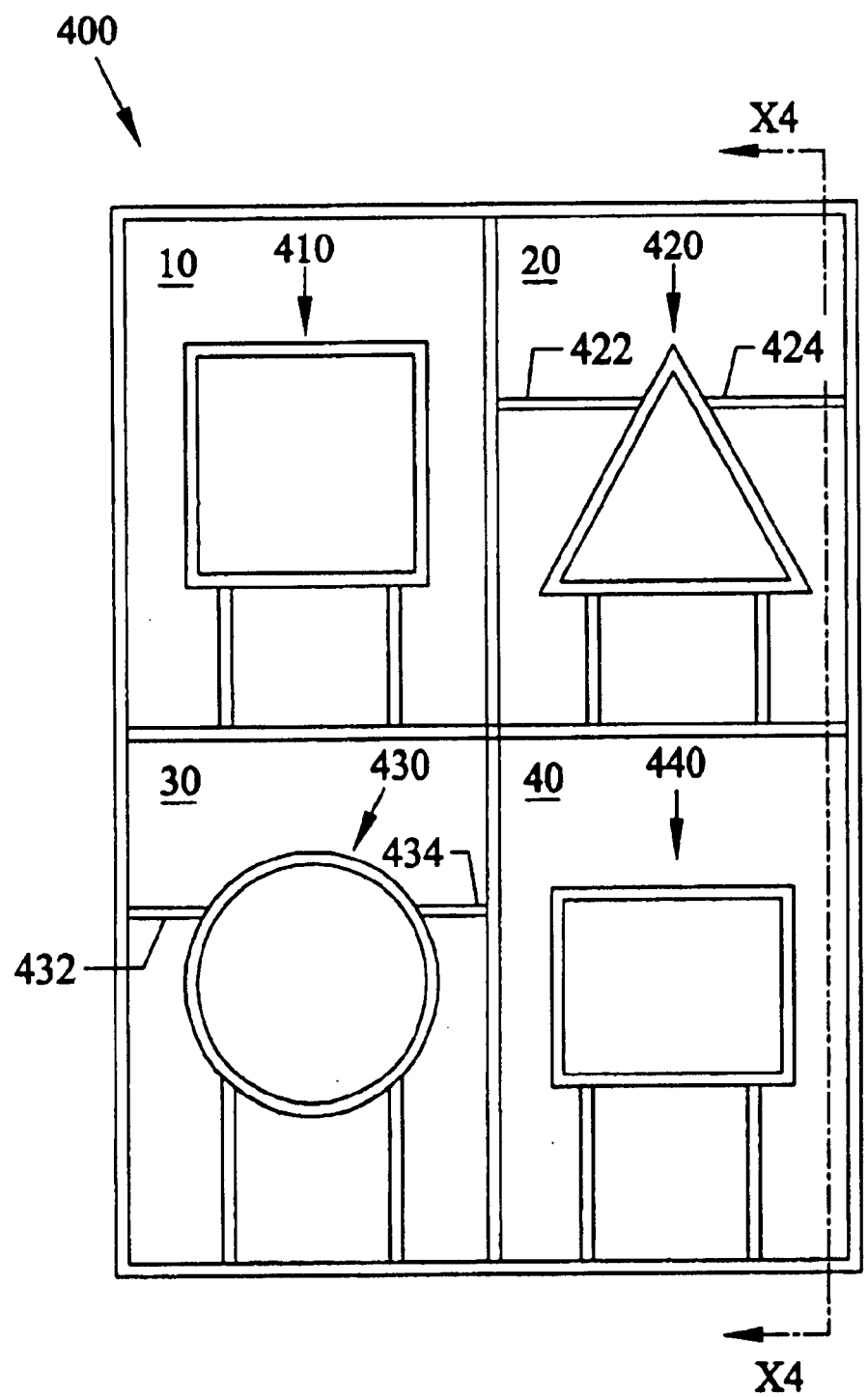
FIG. 16A is a front view of a fourth embodiment of the novel animal habitat.

FIG. 16A is a front view of a fourth embodiment 400 of the novel animal habitat that can include various novel features of the previous embodiments 1, 200, 300 and further include different shapes such as geometrical shapes, such as but not limited to square, rectangles, triangles, and circles that can also form ledges, crawl spaces, hiding spaces, and the like for the small animals to go to. These shapes can also be mounted to rear walls within the compartments. Additionally, these shapes can be free-standing and easily removable from the compartments as needed for changing out the shapes, cleaning the compartments, and the like.

Referring to FIG. 16A, different geometrical shapes such as rectangle 440, square 410, triangle 420 and a circle 430 can be positioned within compartments 10, 20, 30 and 40 such as those previously described. Some geometrical shapes 420, 430 can be fixably mounted inside their respective compartments using fixed goal post supports 422, 424, 432, 434, in a manner similar to those previously described.

Figure 16B:
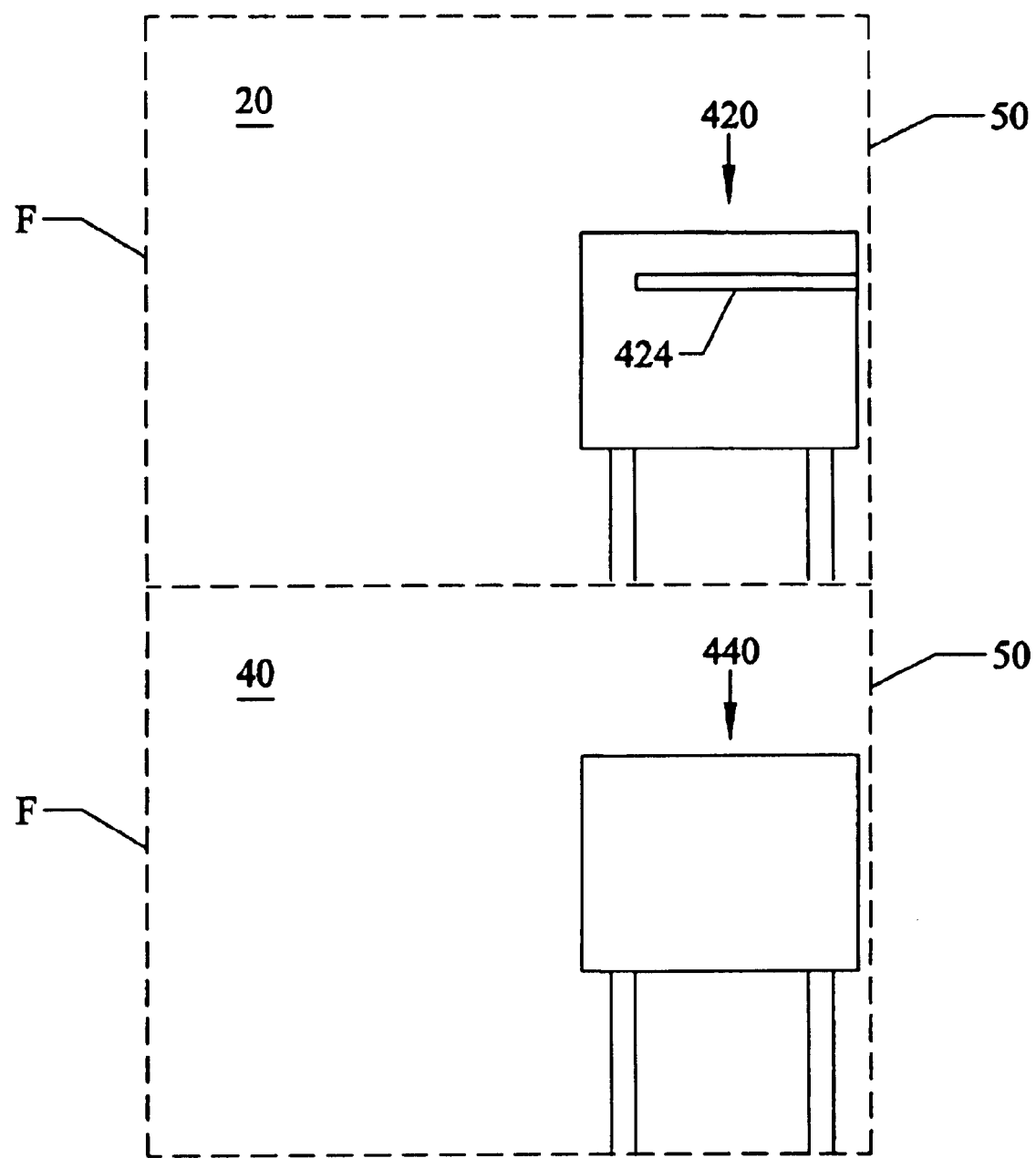
FIG. 16B is a side cross-sectional view of the fourth embodiment of FIG. 16A along arrows X4.

FIG. 16B is a side cross-sectional view of the fourth embodiment of FIG. 16A along arrows X4. The geometrical shapes 420, 440 can be shown to sit within their respective compartments adjacent to the rear wall 50, and spaced apart behind front wall F so that animals can also be located on the floor surfaces of the respective compartments in front of the geometrical shapes.

Figure 17:
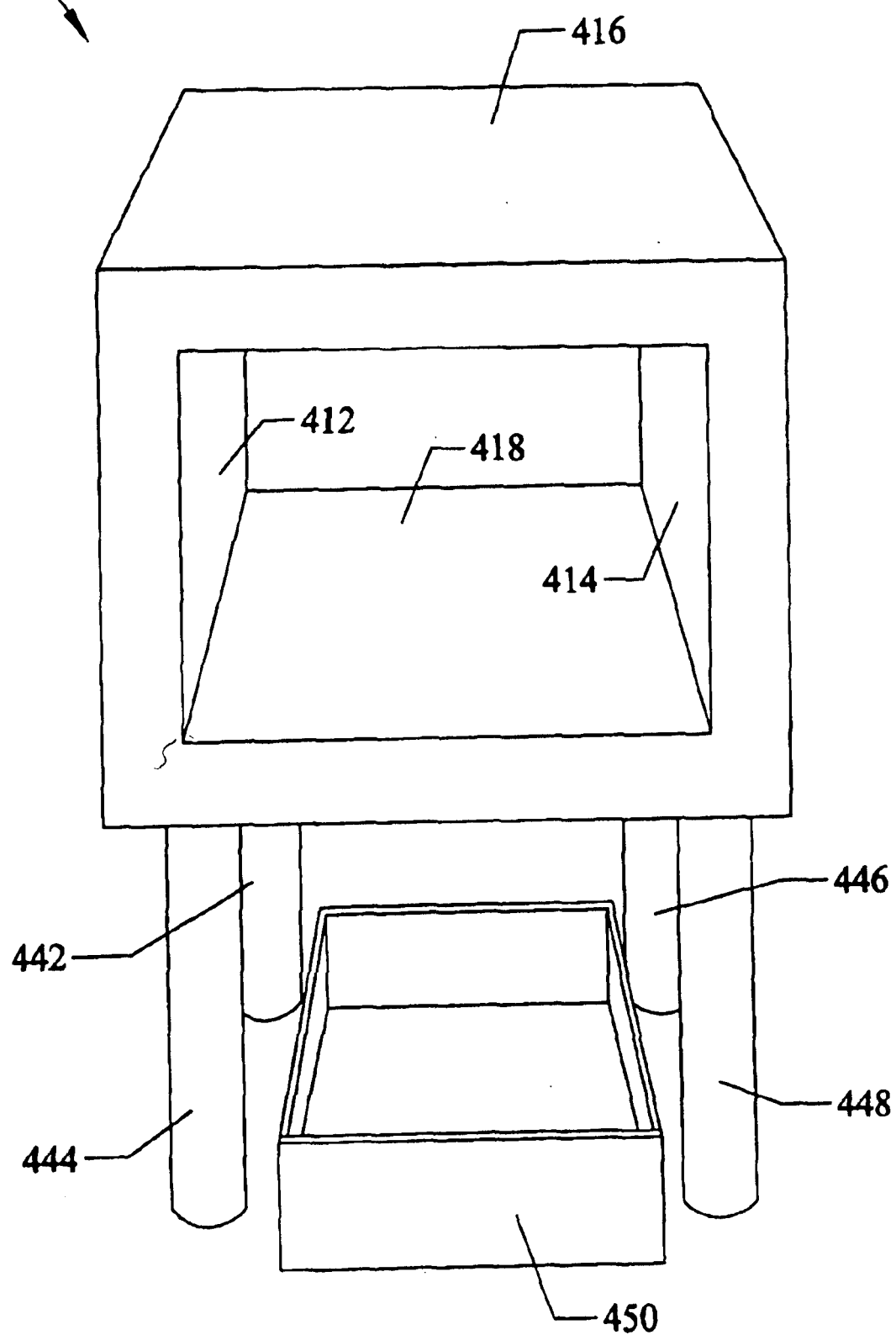
FIG. 17 is a perspective view of a free-standing shape that is used in the fourth embodiment of FIG. 16.

FIG. 17 is a perspective view of a free-standing shape 410/440 that is used in the fourth embodiment of FIG. 16. Here a geometrical shape such as a rectangle/square having sidewalls 412, 414, ceiling panel 416 and floor panel 418 formed from materials such as those previously described can be supported above a floor surface in the compartments 10, 20, 30, 40 by legs 442, 444, 446, 448 so that the entire shape 410, 440 can be moved and lifted out of the compartments similar to moving a table. Similar to the previous embodiments the main portion of the shape such as walls 412, 414, ceiling panel 416 and floor panel 414 can be one color such as red, and the legs 442, 444, 446, 448 can be a different color, or the entire shape and the legs can be the same color, while the rear wall of the compartments and sidewalls, ceiling and floor of the compartments are different colors.

Allowing for a combination embodiment allows for the user to change out the free-standing shapes as desired. For example, a free-standing rectangle can be changed out for a free-standing triangle, and the like.

Although not shown, letters can also be used that are free-standing using the similar stands as that shown in FIG. 17.

Figure 18:
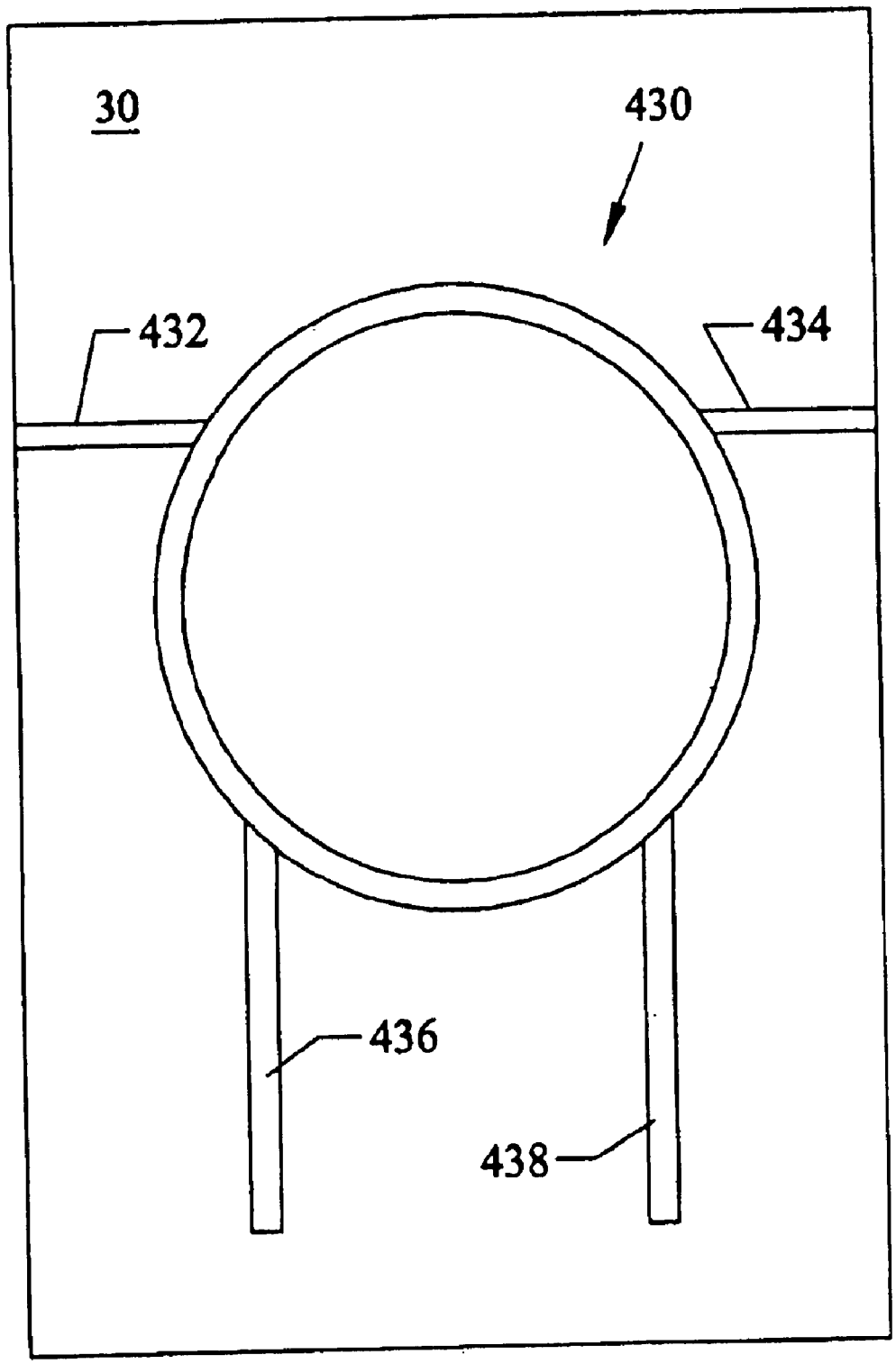
FIG. 18 is a front enlarged view of another one of the geometrical shapes within a compartment of the embodiment shown in FIG. 16A.

FIG. 18 is a front enlarged view of another one of the geometrical shapes 430 within a compartment 30 of the embodiment 400 shown in FIG. 16A. Side posts 432, 434 can also be of a different color as that of the O shape 430, and fixably support the geometrical shape to the sidewalls of the compartment. Legs 436, 438 can also fixably attach the geometrical shape to the floor of the compartment 30. Alternatively, geometrical shape 430 can be preformed with horizontal side posts 432, 434 and legs 436, 438 as part of the shape, so that the entire configuration can be removed from the compartment as a single piece.

FIG. 19 is a perspective view of an additional novel shape 500 that can be used with the embodiments of the preceding figures. Shape 500 can include a lower cylindrical portion 510 having an interior space 515 which can function like a cave for the small animals. A tabletop 520 can be placed on top of cylindrical portion for allowing another surface for the animals. A post 530 attached to tabletop 520 can be attached to a pedestal surface 540 which can also function as another surface for the small animals. Similar to the other shapes, embodiment shape 500 can be formed from a single color, and/or a combination of colors, where for example, the cylinder 510 is a different color than tabletop 520.

The invention can also allow for all the compartments to solely have free-standing and removable shapes such as free-standing geometrical shapes and/or letter shapes, and the like, so that all compartments can be changed out as needed.

Either or both the free-standing shapes and/or the fixable mounted shapes inside the compartments allow for portions of the shapes and goal post type supports to be able to function as ledges, and small interior compartment spaces, crevices, and the like, for the small animals, such as cats, and the like, to sit on, relax and rest within, and the like.

Furthermore, the free-standing and/or fixably mounted geometrical shapes of the fourth embodiment 400 can be used with the novel extra cabinets and/or drawers and/or movable wheels used in previous embodiments.

The novel shapes geometrical shapes 410, 420, 430, 440 have enough space underneath to allow for the spaces underneath to be easily cleaned, and/or allow for removable litter boxes 450 and the like, to be used.

Although the preferred embodiments show the habitats being formed of generally rectangular compartments arranged in side-by-side and/or stacked arrangements, the individual compartments can be have other stackable side-by-side configurations such as but not limited to triangular exterior, hexagon exterior, and the like.

While a preferred embodiment shows spelling out the word CATS, the invention can be used to spell out other words such as but not limited to kittens, dogs, pets, and any other selected names, identifiers, messages, sayings, and the like.

Although letters and geometrical shapes are described, the invention can be used with numbers, and/or various combinations and/or arrangements of letters, numbers and/or geometrical shapes.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An enclosed animal habitat, comprising:
   a first cageless compartment having a see-through front door;

a second cageless compartment having a see-through front door, stacked on the first cageless compartment; and ventilation openings on the compartments only large enough for allowing exterior airflow into and out of the first and second compartments, wherein the first compartment and the second compartment house small animals therein, and wherein the first compartment and the second compartment each include a different shaped letter mounted against a rear wall portion of each compartment.

2. The habitat of claim 1, wherein the first compartment and the second compartment each include: wall and floor materials formed from at least one of plastic and acrylic and laminate.

3. The habitat of claim 1, wherein each of the front doors include:

hinges for connecting the front doors to each of the compartments.

4. The habitat of claim 1, further comprising:

circular portals on at least one of: exterior sides of the compartments or through floor separating the compartments, for allowing access to the habitat.

5. The habitat of claim 1, further comprising:

a third cageless compartment next to the second compartment; and a fourth cageless compartment next to the first compartment and below the second compartment.

6. The habitat of claim 1, further comprising at least one closeable storage compartment on at least the top or bottom of the habitat, for storing items selected from at least one of food, a blanket, and a toy, therein.

7. The habitat of claim 6, wherein the closeable storage compartment includes:

a hinged door thereon.

8. The habitat of claim 6, wherein the closeable storage compartment includes:

a removable drawer.

9. The habitat of claim 1, further comprising:

wheels beneath the habitat for allowing the habitat to be easily moved.

10. The habitat of claim 1, further comprising at least one:

additional compartment next to one of the first and the second compartments; and a portal for allowing access between the additional compartment and the first or the second compartments; and an opaque front wall on the additional compartment having an opaque cover that restricts seeing into the additional compartment.

11. An enclosed animal habitat comprising:

a first cageless compartment having a see-through front door;

a second cageless compartment having a see-through front door, stacked on the first cageless compartment;

ventilation openings on the compartments only large enough for allowing exterior airflow into and out of the first and second compartments; and different geometrical shapes in the first and the second compartments; and L-shaped goal support posts for supporting the geometrical shapes, wherein the compartments house at least one animal therein.

12. The habitat of claim 11, wherein the different geometrical shapes are selected from at least one of: a circle, a rectangle, a square, and a triangle.

13. The habitat of claim 11, further comprising:

space below the geometrical shapes for allowing litter trays to be removably located and for allowing floor surface areas of the compartments to be easily cleaned.

14. An enclosed habitat for safely displaying, storing and housing small animals, comprising:

at least two compartments adjacent to one another, each compartment having see-through door panels, the compartments forming an enclosed habitat for the small animals;

different shapes positioned on rear walls of the compartments, the shapes having a different color than colors of the rear walls, so that the shapes are visually discernable from the door panels of the compartments; and L-shaped goal support posts for supporting each of the shapes.

15. The habitat of claim 14, wherein the different colored shapes include:

letters.

16. The habitat of claim 14, wherein the different colored shapes include:

geometrical shapes.

17. The habitat of claim 14, further comprising:

space below the shapes inside the compartments for allowing litter trays to be removably located and for allowing floor surfaces below the shapes to be easily cleaned.

18. A method of housing and displaying small animals in habitats comprising the steps of:

positioning at least two cageless compartments for housing and displaying the small animals flush against one another;

providing see-through door panels on the compartments; and supporting shapes by L-shaped goal support posts in the compartments, the shapes having different colors than the rear walls so that the shapes can be visually seen through the door panels.

19. The method of claim 18, wherein the step of positioning includes the step of:

stacking the compartments on top of one another.

20. The method of claim 18, wherein the step of positioning includes the step of:

abutting the compartments side-by-side to one another.

21. The method of claim 18, wherein the step of supporting the shapes includes the step of: supporting different letters in the compartments.

22. The method of claim 18, wherein the step of supporting the shapes includes the step of: supporting different geometrical shapes in the compartments.

23. The method of claim 18, further comprising the step of:

providing spaces below the shapes inside the compartments for allowing litter trays to be removably located and for allowing floor surfaces below the shapes to be easily cleaned.

24. The method of claim 18, further comprising the step of:

ventilating the compartments with openings large enough for allowing airflow but small enough for preventing the animals from passing therethrough.

25. An enclosed animal habitat, comprising:

a first cageless compartment having a see-through front door;

a second cageless compartment having a see-through front door, stacked on the first cageless compartment; and ventilation openings on the compartments only large enough for allowing exterior airflow into and out of the first and second compartments;

a third cageless compartment next to the second compartment;

a fourth cageless compartment next to the first compartment and below the second compartment; and different letters mounted in each of the first, second, third, and fourth compartments, the different letters include C, A, T, and S, wherein the compartments house at least one animal therein.

26. An enclosed animal habitat, comprising:

a first cageless compartment having a see-through front door;

a second cageless compartment having a see-through front door, stacked on the first cageless compartment; and ventilation openings on the compartments only large enough for allowing exterior airflow into and out of the first and second compartments;

a third cageless compartment next to the second compartment;

a fourth cageless compartment next to the first compartment and below the second compartment; and letters mounted in each of the first, second, third, and fourth compartments; and L-shaped goal support posts for supporting each of the letters, wherein the compartments house at least one animal therein.

27. An enclosed animal habitat, comprising:

a first cageless compartment having a see-through front door;

a second cageless compartment having a see-through front door, stacked on the first cageless compartment; and ventilation openings on the compartments only large enough for allowing exterior airflow into and out of the first and second compartments;

a third cageless compartment next to the second compartment;

a fourth cageless compartment next to the first compartment and below the second compartment;

letters mounted in each of the first, second, third, and fourth compartments; and free standing supports for supporting each of the letters so that the letters can be easily moved from the compartments, wherein the compartments house at least one animal therein.

28. An enclosed animal habitat, comprising:

a first cageless compartment having a see-through front door;

a second cageless compartment having a see-through front door, stacked on the first cageless compartment; and ventilation openings on the compartments only large enough for allowing exterior airflow into and out of the first and second compartments;

a third cageless compartment next to the second compartment;

a fourth cageless compartment next to the first compartment and below the second compartment;

letters mounted in each of the first, second, third, and fourth compartments; and space below the letters for allowing litter trays to be removably located and for allowing floor surfaces of the compartments to be easily cleaned, wherein the compartments house at least one animal therein.

29. A method of housing and displaying small animals in habitats comprising the steps of:

positioning at least two compartments for housing and displaying the small animals flush against one another;

providing see-through door panels on the compartments; and supporting by a free standing support at least one letter in the compartments above a floor surface of a compartment, so that the at least one letter is supported above the floor surface, the at least one letter can be visually seen through the door panels.

30. The method of claim 29 wherein the supporting step includes the step of:

supporting each letter by L-shaped goal posts.

31. The method of claim 29 wherein the supporting step includes the step of:

supporting each letter by a least two substantially vertical legs parallel to and spaced apart from one another, wherein each letter is entirely supported above a floor surface of that compartment by the legs.

32. The method of claim 31, wherein the supporting step further includes the step of:

providing a set of four substantially vertical legs parallel to one another, wherein each letter is entirely supported above a floor surface of that compartment by one set of four legs.

33. A method of housing and displaying small animals in habitats comprising the steps of:

positioning at least two compartments for housing and displaying the small animals flush against one another;

providing see-through door panels on the compartments; and supporting by a free standing support at least one geometrical shape in at least one of the compartments entirely above a floor surface the compartment, the at least one geometrical shape being selected from a square, a rectangle, a triangle and a circle the at least one geometrical shape having a longitudinal plane substantially parallel to the longitudinal plane of the door panels, the at least one geometrical shape having a front-facing opening for allowing access by the small animals, the at least one geometrical shape can be visually seen through the door panels.

34. The method of claim 33, the supporting step includes the step of:

supporting each geometrical shape by L-shaped goal posts.

35. The method of claim 33, wherein the supporting step includes the step of: supporting each geometrical shape by a least two substantially vertical legs parallel to and spaced apart from one another wherein each geometrical shape is entirely supported above a floor surface of that compartment by the legs.

36. The method of claim 35, wherein the supporting step further includes the step of: providing a set of four substantially vertical legs parallel to one another, wherein each geometrical shape is entirely supported above a floor surface by one set of four legs.

37. An enclosed animal habitat for housing and displaying small, nonhuman animals, comprising:

a first compartment having a see-through front door;

a second compartment having a see-through front door, directly adjacent to the first compartment; and ventilation openings on the compartments only large enough for allowing exterior airflow into and out of the first and second compartments;

shapes selected from at least one of letters and geometrical shapes, located within the compartments, the geometrical shapes selected from a square, a rectangle, a triangle and a circle, the shapes each having a longitudinal plane being substantially parallel to the longitudinal plane of the door, the shapes each having at least one front-facing opening for allowing access by said small, nonhuman animals;

free-standing supports for supporting each of the shapes within the compartments, the free-standing supports including a pair of substantially vertical spaced apart parallel legs located underneath each of the shapes so that an entire shape is raised above a floor surface of the compartment, wherein the compartments house at least one animal therein.

38. The enclosed animal habitat of claim 37, wherein the free-standing supports each include:

a set of four substantially vertical legs parallel to one another, wherein each shape is supported by one set of four legs, so that an entire shape is raised above a floor surface of the compartment.

* * * * *